Jan. 25, 1949. J. A. MULLER 2,459,956
PIPE COUPLING
Filed May 16, 1945
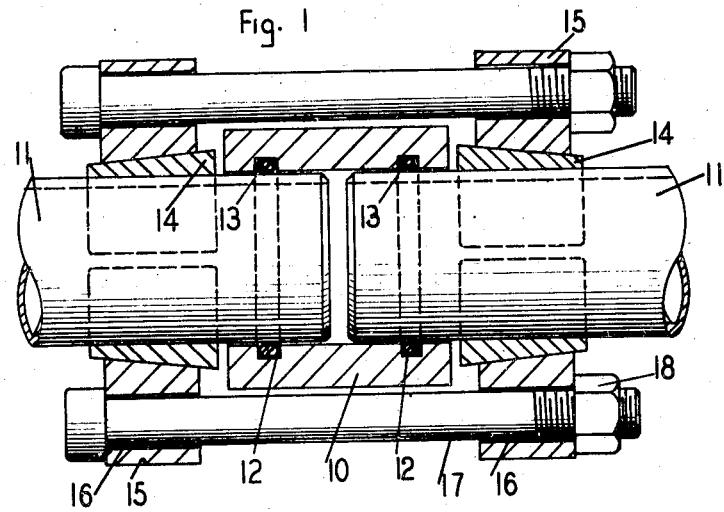
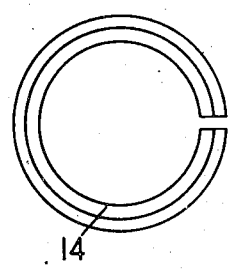
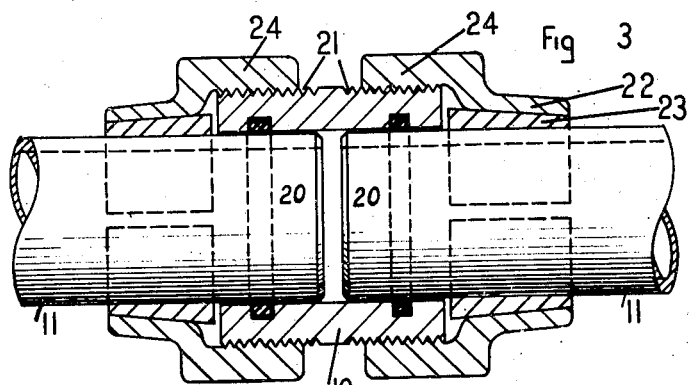
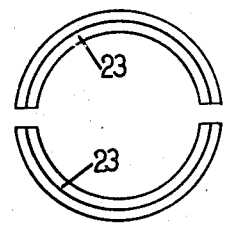
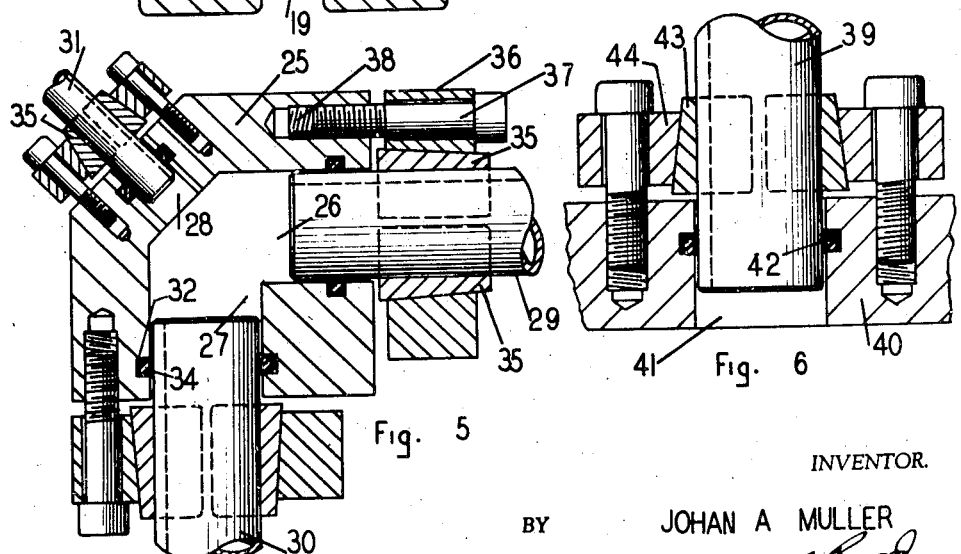
INVENTOR.
JOHAN A MULLER Patented Jan. 25, 1949

2,459,956

UNITED STATES PATENT OFFICE 2,459,956

PIPE COUPLING

Johan A. Muller, Dayton, Ohio, assignor to John L. Lenz, Dayton, Ohio

Application May 16, 1945, Serial No. 594,056

2 Claims. (Cl. 285—123)

This invention relates to pipe couplings and one object of the invention is to provide a simple and efficient means whereby a tightly sealed connection may be quickly and easily established between a pipe and a structure having a fluid passageway.

A further object of the invention is to provide coupling means which may be installed and the connection tightly sealed without flaring, threading or otherwise modifying the form of the pipe to correspond to the coupling members.

A further object of the invention is to provide coupling means which will effect a tightly sealed connection without requiring the pipe to be cut to an exact predetermined length, thus facilitating the installation of the coupling and avoiding excessive strain on the pipe or pipes.

A further object of the invention is to provide coupling means in which the sealing element is inserted in the passageway and the insertion of the pipe into the passageway automatically effects a tight pressure seal.

Other objects of the invention may appear as the coupling is described in detail.

In the accompanying drawings Fig. 1 is a longitudinal section taken through a coupling for joining two pipes one with the other; Fig. 2 is an end view of the split collar of Fig. 1; Fig. 3 is a longitudinal sectional view of a slightly modified form of the coupling; Fig. 4 is an end view of the split collar of Fig. 3; Fig. 5 is a sectional view of a coupling for joining three pipes; and Fig. 6 is a sectional view of a coupling for joining a single pipe to a structure which is to receive the fluid therefrom.

In these drawings I have illustrated the preferred construction of my invention and have shown several embodiments of the same. As shown in Fig. 1 the coupling is designed for joining two alined pipes and it comprises a tubular structure, or sleeve, 10 adapted to receive the end portions of two pipes 11. Adjacent each end thereof the sleeve is provided with an internal circumferential groove 12 in which is mounted an annular sealing element 13 which may be of a suitable rubber composition or other suitable compressionable material. It may be of any suitable cross sectional shape but it is preferably round in cross section and is of such thickness that the inner portion thereof will project into the passageway in the tubular structure or sleeve 10, so that when the end portion of the pipe is inserted in the passageway it will engage the rounded surface of the sealing member and compress the same to permit the pipe to pass through the sealing member and thus form a tight pressure seal between the sleeve and the pipe. The sealing member may be endless or it may be in the nature of a split ring of such length and having its ends so arranged that the compression thereof by the pipe will bring the ends thereof into sealing contact one with the other.

Mounted about each pipe 11, adjacent the end of the sleeve 10, is a split collar 14 and extending about that collar is means for clamping the same in firm frictional contact with the pipe. Preferably the collar is provided with an outwardly tapered exterior surface and the clamping member is in the form of an annulus 15 having its internal surface tapered to conform to the tapered external surface of the collar, so that the movement of the clamping member toward the structure or sleeve with which the end of the pipe is connected will clamp the collar firmly about the pipe. When the collar is so clamped about the pipe its frictional contact therewith will cause the same to move with the pipe should the latter tend to move outwardly, thereby causing the clamping member to more tightly compress the collar about the pipe and positively prevent any appreciable outward movement of the latter. The clamping members 15 may be held against movement with relation to the structure with which the pipes are connected in any suitable manner and in the form shown in Fig. 1 each clamping member has a plurality of openings 16 and bolts 17 extending through the corresponding openings of the two clamping members, so that the tightening of the nuts 18 on the bolts will draw the two clamping members one toward the other and toward the sleeve, and will hold the clamping members against movement with relation one to the other or to the sleeve after they have been moved to clamping position. A very short movement of the clamping member with relation to the split collar will move the latter into firm frictional contact with the pipe and it is not necessary or desirable that the bolts, or other actuating means for the clamping member, should be tightened any more than is required to effect this frictional contact.

In Fig. 3 the tubular structure or sleeve 19 is provided with internal grooves and sealing members 20, as above described, and is also provided at its respective ends with exterior screw threads 21. Each clamping member has an outer end portion 22 provided with a tapered internal surface to engage the tapered surface of the split collar 23 which may, if desired, be split at both sides, as shown in Fig. 4, and thus divided into two parts which are connected one with the other by the clamping member. The inner ends 24 of the clamping members are provided with internal screw threads to engage the threaded ends of the sleeve 19, the threads being preferably right and left hand threads so that the clamping members will move toward one another as they are threaded onto the sleeve by the relative rotation of the sleeve and the clamping members.

In Fig. 5 there is shown a coupling whereby three pipes may be connected one with the other. In this form the coupling comprises a structure 25 having three communicating passageways 26, 27 and 28, each of which extends at an angle to the other two. The passageways may be of the same diameter or of different diameters. In the present instance the passageways 26 and 27 are of the same diameter and adapted to receive the end portions of pipes 29 and 30, and the passageway 28 is of relatively small diameter to receive a small pipe 31. Each passageway is provided with an annular groove 32 and a sealing member 34 to effect a tight pressure seal between the same and the wall of the passageway in which it is inserted, in the manner above described. Split collars 35 are mounted about the pipes adjacent the outer ends of the respective passageways and are provided with outwardly tapered exterior surfaces. Clamping members 36 extend about the respective split sleeves 35 and are connected with the structure 25 by screws 37 which extend through openings in the respective clamping members and are threaded into openings 38 in the structure 25.

In Fig. 6 a single pipe 39 is connected with the wall of a structure 40, which may be a fixed structure such as a compressor or other fluid container or conduit. The structure is provided with a passageway 41 to receive the end of the pipe 39 and is provided with sealing means 42 of the type above described. The split collar 43 is mounted about the pipe and clamping member 44 is connected with the structure 40 in the same manner as the clamping members of Fig. 5.

A coupling device of the type here shown may be very quickly and easily installed to connect a plurality of pipes one with the other or to connect a single pipe with the space within a tubular or hollow structure to or from which the fluid is to pass, and the pipe or one of the pipes can be easily removed and replaced. The coupling may be applied to the ends of ordinary pipes or tubes and the necessity of flaring, threading or otherwise modifying the pipe or tube to conform to the coupling is avoided. It is not necessary that the pipes should be cut to exact predetermined lengths as they may extend into the passageway any suitable distance, it being only necessary that they should extend through the sealing members which are supported within the passageways. Only a relatively light pressure on the clamping members is required to compress the split collar into engagement with the pipe and establish frictional contact sufficient to resist a very high internal pressure. The seal between the pipe and the wall of the passageway is automatically established by the insertion of the pipe into the passageway and is maintained by retaining the pipe in a substantially fixed position with relation to the structure with which it is connected. When the sealing member is in the form of a split ring it is unnecessary to prestress either the sealing member or the connecting bolts or screws.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent is:

1. In a pipe coupling, a sleeve adapted to receive the end portion of a pipe, having in the inner surface thereof a circumferential groove and having an exteriorly threaded end portion, an annular sealing member seated in said groove and projecting beyond the inner surface of said sleeve to engage said pipe about the entire circumference of the latter, means to secure said pipe in said sleeve comprising a split collar mounted about said pipe adjacent said sleeve, said split collar being separate from said sleeve having a uniform inside diameter and a smooth interior surface throughout the length thereof, and having an outwardly tapered exterior surface, and an annular clamping member having an interiorly threaded portion engaging the threaded portion of said sleeve and having an outer end portion extending about said split collar, said outer end portion of said clamping member having a smooth inwardly flared interior surface conforming to and engaging the tapered exterior surface of said split collar, whereby the inward movement of said clamping member will clamp said split collar in firm frictional contact with said pipe.

2. In a pipe coupling, a body member having a passageway to receive the end of a pipe and having in the wall of said passageway a circumferential groove, a sealing member supported in said groove and projected beyond the wall of said passageway to engage said pipe about the entire circumference of the latter, means to secure said pipe in said body member comprising a split collar mounted about said pipe adjacent said body member, said split collar being separate from said body member, having a uniform interior diameter and a smooth interior surface throughout the length thereof, and having an outwardly tapered exterior surface, an annular clamping member extending about said split collar and having its interior surface flared to conform to the exterior surface of said split collar, and means for connecting said clamping member with and for drawing the same toward said body member to clamp said split collar in firm frictional contact with said pipe.

JOHAN A. MULLER.

REFERENCES CITED

The following references are of record in the file of this patent:

UNITED STATES PATENTS

| Number | Name | Date |
|---|---|---|
| 1,498,855 | Parker | June 24, 1924 |
| 2,376,017 | Smallpeice | May 15, 1945 |
| 2,383,692 | Smith | Aug. 28, 1945 |

FOREIGN PATENTS

| Number | Country | Date |
|---|---|---|
| 542,026 | Great Britain | Dec. 23, 1941 |